(12) United States Patent
Suzuki

(10) Patent No.: US 12,523,246 B2
(45) Date of Patent: Jan. 13, 2026

(54) LAP FILLET WELD JOINT, PRODUCTION METHOD THEREOF AND MEMBER WITH CLOSED CROSS SECTION

(71) Applicant: KOBE STEEL, LTD., Kobe (JP)

(72) Inventor: Reiichi Suzuki, Kanagawa (JP)

(73) Assignee: KOBE STEEL, LTD., Kobe (JP)

( * ) Notice: Subject to any disclaimer, the term of this patent is extended or adjusted under 35 U.S.C. 154(b) by 385 days.

(21) Appl. No.: 18/004,796

(22) PCT Filed: Jul. 9, 2021

(86) PCT No.: PCT/JP2021/025944
§ 371 (c)(1),
(2) Date: Jan. 9, 2023

(87) PCT Pub. No.: WO2022/014489
PCT Pub. Date: Jan. 20, 2022

(65) Prior Publication Data
US 2023/0243376 A1    Aug. 3, 2023

(30) Foreign Application Priority Data
Jul. 15, 2020   (JP) .................................. 2020-121667

(51) Int. Cl.
*F16B 5/08*    (2006.01)
*B23K 26/26*   (2014.01)
*B23K 26/348*  (2014.01)

(52) U.S. Cl.
CPC .............. *F16B 5/08* (2013.01); *B23K 26/26* (2013.01); *B23K 26/348* (2015.10)

(58) Field of Classification Search
CPC ...... F16B 5/08; B23K 26/244; Y10T 403/472
See application file for complete search history.

(56) References Cited

U.S. PATENT DOCUMENTS 5,454,480 A * 10/1995 Morris, Jr. ........... B23K 26/244
                                                    220/679
10,688,580 B2 * 6/2020 Ogawa ................. B23K 31/003
(Continued)

FOREIGN PATENT DOCUMENTS

DE          199 43 752    * 5/2001 ............. B23K 26/32
EP          3 423 226 A1    1/2019
(Continued)

OTHER PUBLICATIONS

Extended European Search Report issued on Nov. 3, 2023 in European Patent Application No. 21841286.4, 8 pages.
(Continued)

*Primary Examiner* — Michael P Ferguson
(74) *Attorney, Agent, or Firm* — Oblon, McClelland, Maier & Neustadt, L.L.P.

(57) ABSTRACT

A lap fillet weld joint and a lap fillet weld joint manufacturing method are provided. On a side of a first edge, a first metal plate is provided with a bulging portion that has an internal space of a prescribed size, and a second metal plate has a protruding portion that faces to the bulging portion and can be inserted into the bulging portion. In a state in which the protruding portion has been inserted into the bulging portion, the first metal plate and a second edge of the second metal plate are welded, and a first weld bead is formed.

21 Claims, 13 Drawing Sheets

(56) References Cited

U.S. PATENT DOCUMENTS

| | | |
|---|---|---|
| 2012/0003035 A1 | 1/2012 | Suzuki et al. |
| 2015/0071703 A1 | 3/2015 | Ishida et al. |
| 2015/0196967 A1 | 7/2015 | Tsuchiya et al. |
| 2018/0029166 A1 | 2/2018 | Kodama et al. |
| 2018/0207751 A1 | 7/2018 | Kodama et al. |
| 2018/0339368 A1 | 11/2018 | Shiozaki et al. |
| 2018/0369959 A1 | 12/2018 | Miessmer |
| 2019/0136886 A1* | 5/2019 | Kawashita ................ F16B 5/08 |

FOREIGN PATENT DOCUMENTS

| | | | |
|---|---|---|---|
| EP | 3 423 226 B1 | 4/2020 | |
| FR | 3 047 912 * | 8/2017 | ........... B21D 39/038 |
| JP | 3899007 B2 | 3/2007 | |
| JP | 2014-4609 A | 1/2014 | |
| JP | 5450293 B2 | 3/2014 | |
| JP | 5522317 B2 | 6/2014 | |
| JP | 2015-199072 A | 11/2015 | |
| JP | 5843015 B2 | 1/2016 | |
| JP | 5880260 B2 | 3/2016 | |
| JP | 6008072 B1 | 10/2016 | |
| JP | 2017-80802 A | 5/2017 | |
| JP | 2018-30169 A | 3/2018 | |
| JP | 6515299 B2 | 5/2019 | |

OTHER PUBLICATIONS

International Search Report issued Sep. 7, 2021 in PCT/JP2021/025944 filed Jul. 9, 2021, 2 pages.

* cited by examiner

LAP FILLET WELD JOINT, PRODUCTION METHOD THEREOF AND MEMBER WITH CLOSED CROSS SECTION

TECHNICAL FIELD

The present invention relates to a lap fillet weld joint, a production method thereof and a member with a closed cross section.

BACKGROUND ART

A structural member of an automobile is required to have not only static strength and rigidity but also high fatigue resistance. Further, a steel plate or an aluminum alloy plate is often joined by welding in view of efficiency and cost superiority when similar materials are used. On the other hand, there is always a need to reduce the weight of a vehicle body in order to improve fuel consumption, and as a countermeasure therefor, thinning of steel materials or aluminum alloy materials by increasing strength thereof has been advanced recently. However, it is a common knowledge that strength of a weld joint does not increase linearly in conjunction with the strength of the material and does not improve so much. The problem of joint fatigue strength is one of the causes that are difficult to solve by a high-strength material and thinning.

It is said that there are mainly three causes for the fatigue of the weld joint to be lower than that of a plate material. Hereinafter, as shown in FIG. 12, a lap fillet weld joint 1 in which a first metal plate 10 and a second metal plate 20 are overlapped and an edge portion 21 of the second metal plate 20 and a surface 11 in the vicinity of an edge portion 12 of the first metal plate 10 are welded by a weld bead 30 will be described as an example.

The first cause is geometric stress concentration. As shown in FIG. 13, a boundary between the weld bead 30, which is a welded portion, and the first metal plate 10 and the second metal plate 20, which are metal members, is a discontinuous line, so that stress is concentrated on a toe of the weld bead. Magnitude of the stress concentration is inversely proportional to smoothness of the toe of the weld bead.

The second cause is deterioration of the material. The first metal plate 10 and the second metal plate 20 are subjected to rapid heating and rapid cooling to form a heat-affected portion 31 whose crystal structure is changed from an original material. Accordingly, material characteristics such as hardness, toughness, and elongation are locally changed in the heat-affected portion 31.

The third cause is tensile residual stress. In addition to a series of heat hysteresis of a temperature rise and a temperature fall, the tensile residual stress generally remains in the vicinity of the welded portion after cooling is performed at room temperature due to a constraint around the welded portion. The tensile residual stress is considered to be a factor of a decrease in the fatigue strength.

The geometric stress concentration, the local material deterioration, and the tensile residual stress are superimposed to deteriorate the joint fatigue characteristics.

In view of such a background, various efforts and studies have been made to improve the fatigue strength of the weld joint from the related art in consideration of a mechanism thereof. For example, in Patent Literature 1, a part of a material is locally reduced in thickness for the purpose of separating a stress concentration portion from a weld bead. In Patent Literatures 2 and 3, various peening treatments are performed after arc welding, and compressive residual stress is applied to a stress concentration portion. In Patent Literature 4, a welding material having a special composition is adopted, and a compressive stress is applied by utilizing martensite transformation. In Patent Literatures 5 and 6, after the end of welding, the periphery of a toe is subjected to a heat treatment again using a heat source such as a plasma arc or a laser. In Patent Literatures 7 and 8, another weld metal called a stiffening bead is provided. In Patent Literature 9, a convex press bead is provided adjacent to a weld bead. Further, a method has been proposed in which a toe is smoothly formed by a grinder grinding means, or a product itself is put into a furnace and annealed to reduce tensile residual stress.

CITATION LIST

Patent Literature

Patent Literature 1: JP2018-30169A
Patent Literature 2: JP5880260B
Patent Literature 3: JP3899007B
Patent Literature 4: JP5450293B
Patent Literature 5: JP2014-4609A
Patent Literature 6: JP6515299B
Patent Literature 7: JP5522317B
Patent Literature 8: JP5843015B
Patent Literature 9: JP6008072B

SUMMARY OF INVENTION

Technical Problem

Meanwhile, in the case of a thin plate, there is another deterioration factor in addition to the above-described factors of the decrease in the fatigue strength. This is due to poor restraint of the metal member, distortion and deflection of the metal member itself, deterioration of plate alignment accuracy caused by thermal deformation generated at the time of welding, and the like, that is, enlargement of a root gap G which is a so-called gap between plates. When there is no root gap G, the maximum stress concentration portion on the joint 1 is the toe of the weld bead. However, as shown in FIGS. 14 and 15, when the root gap G is generated, the toe does not necessarily become the maximum stress concentration portion due to the rigidity deterioration, and the root gap G portion becomes the maximum stress concentration portion, and fracture is more likely to occur at an earlier stage. The means for improving joint fatigue strength described in Patent Literatures 1 to 9, which have been devised in various ways so far, do not have an effect of suppressing an increase in the root gap G, and thus there is room for further improvement.

The present invention has been made in view of the above-described problems, and an object thereof is to provide a lap fillet weld joint and a production method thereof capable of effectively improving fatigue strength with a simple structure.

Solution to Problem

Accordingly, the above object of the present invention is achieved by the following configuration (1) according to a lap fillet weld joint.

(1) A lap fillet weld joint produced by overlapping and welding a first metal plate and a second metal plate, the first metal plate has at least one bulging portion on an edge portion on one side which is a side welded to the second metal plate, the bulging portion extending along a length direction from the edge portion on the one side toward an edge portion on the other side of the first metal plate, and bulging in a direction facing the second metal plate with respect to a flat plate portion, the second metal plate has at least one protruding portion on an edge portion on one side which is a side welded to the first metal plate, the protruding portion protruding in a direction from an edge portion on the other side of the second metal plate toward the edge portion on the one side, and being capable of being inserted into the bulging portion, the lap fillet weld joint comprises a first weld bead formed by welding the first metal plate and the edge portion of the second metal plate on the one side of the second metal plate in a state where the protruding portion is inserted into the bulging portion, and the bulging portion is formed such that a height of the first metal plate in a plate thickness direction is equal to or greater than a sum of a plate thickness of the first metal plate and a plate thickness of the second metal plate, and a length of the first metal plate in the length direction exceeds a sum of a leg length of the first weld bead between the first metal plate and the second metal plate and a length of a weld heat-affected zone extending from the first weld bead to the other side of the first metal plate.

According to this configuration, with a simple structure, stress concentration in the welded portion is alleviated, and the welded portion in which a root gap is suppressed is formed, so that joint fatigue strength can be effectively improved.

Further, a preferred embodiment of the present invention related to the lap fillet weld joint relates to the following (2) to (8).

(2) In the lap fillet weld joint according to the above (1), in the second metal plate, the protruding portion is formed between a pair of cutouts that is formed along the length direction from the edge portion on the one side of the second metal plate.

According to the configuration, the protruding portion can be easily formed by providing the cutouts.

(3) In the lap fillet weld joint according to the above (1) or (2), the bulging portion is formed by press molding.

According to this configuration, the bulging portion can be formed accurately and easily.

(4) The lap fillet weld joint according to any one of the above (1) to (3), further comprising a second weld bead formed by welding the second metal plate and the edge portion of the first metal plate on the one side of the first metal plate at a position corresponding to the bulging portion.

According to this configuration, the fatigue strength of the lap fillet weld joint can be further improved.

(5) In the lap fillet weld joint according to the above (4), the first weld bead and the second weld bead are continuously formed.

According to this configuration, welding operation of the first weld bead and the second weld bead is facilitated.

(6) In the lap fillet weld joint according to any one of the above (1) to (5), the first metal plate has at least one cutout portion in the edge portion on the one side of the first metal plate, and the bulging portion is formed at a position corresponding to the cutout portion.

According to this configuration, an overlapping area between the first metal plate and the second metal plate can be increased, and the fatigue strength is further improved.

(7) In the lap fillet weld joint according to any one of the above (1) to (6), the height of the first metal plate in the plate thickness direction in an internal space formed by the bulging portion is substantially equal to a sum of the plate thickness of the first metal plate and the plate thickness of the second metal plate.

According to this configuration, an effect of suppressing the root gap is further improved.

(8) In the lap fillet weld joint according to any one of the above (1) to (7), the bulging portion is formed such that the height of the first metal plate in the plate thickness direction gradually decreases from an inlet side of the protruding portion toward the edge portion of the first metal plate on the other side of the first metal plate.

According to this configuration, the first metal plate and the second metal plate can be restrained without loosening while the protruding portion is easily inserted into the bulging portion.

The above object of the present invention is achieved by the following configuration (9) related to a member with a closed cross section.

(9) A member with a closed cross section to which the lap fillet weld joint according to any one of the above (1) to (8) is applied.

According to this configuration, the member with a closed cross section having improved joint fatigue strength can be produced.

The above object of the present invention is achieved by the following configuration (10) related to a production method of a lap fillet weld joint.

(10) A production method of a lap fillet weld joint produced by overlapping and welding a first metal plate and a second metal plate, comprising:

a step of forming at least one bulging portion on an edge portion of the first metal plate on one side of the first metal plate, which is a side to be welded to the second metal plate, the bulging portion extending along a length direction from the edge portion on the one side toward an edge portion on the other side of the first metal plate, and bulging in a direction facing the second metal plate with respect to a flat plate portion;

a step of forming at least one protruding portion on an edge portion of the second metal plate on one side of the second metal plate, which is a side to be welded to the first metal plate, the protruding portion protruding in a direction from an edge portion on the other side of the second metal plate toward the edge portion on the one side, and being capable of being inserted into the bulging portion;

a step of overlapping the first metal plate with the second metal plate while inserting the protruding portion into the bulging portion; and a step of forming a first weld bead by welding the first metal plate and the edge portion of the second metal plate on the one side of the second metal plate, and the bulging portion is formed such that a height of the first metal plate in a plate thickness direction is equal to or greater than a sum of a plate thickness of the first metal plate and a plate thickness of the second metal plate, and a length of the first metal plate in the length direction exceeds a sum of a leg length of the first weld bead between the first metal plate and the second metal plate and a length of a weld heat-affected zone extending from the first weld bead to the other side of the first metal plate.

According to this configuration, with a simple structure, stress concentration in the welded portion is alleviated, and the welded portion in which a root gap is suppressed is formed, so that joint fatigue strength can be effectively improved.

Further, a preferred embodiment of the present invention related to the production method of a lap fillet weld joint relates to the following (11) to (16).

(11) In the production method of a lap fillet weld joint according to the above (10), in the second metal plate, the protruding portion is formed between a pair of cutouts that is formed along the length direction from the edge portion on the one side of the second metal plate.

According to the configuration, the protruding portion can be easily formed by providing the cutouts.

(12) In the production method of a lap fillet weld joint according to the above (10) or (11), the bulging portion is formed by press molding.

According to this configuration, the bulging portion can be formed accurately and easily.

(13) In the production method of a lap fillet weld joint according to any one of the above (10) to (12), the step of forming the first weld bead is performed by any one of an arc welding method, a laser welding method, and a laser arc hybrid welding method.

According to this configuration, the joint fatigue strength can be effectively improved by any one of the welding methods.

(14) The production method of a lap fillet weld joint according to any one of the above (10) to (13) further includes: a step of forming a second weld bead by welding the second metal plate and the edge portion of the first metal plate on the one side of the first metal plate at a position corresponding to the bulging portion.

According to this configuration, the fatigue strength of the lap fillet weld joint can be further improved.

(15) In the production method of a lap fillet weld joint according to the above (14), the first weld bead and the second weld bead are formed by continuous welding.

According to this configuration, welding operation of the first weld bead and the second weld bead is facilitated.

(16) The production method of a lap fillet weld joint according to any one of the above (10) to (15) further includes: a step of forming at least one cutout portion in the edge portion of the first metal plate on the one side of the first metal plate before forming the bulging portion on the first metal plate, and the bulging portion is formed at a position corresponding to the cutout portion.

According to this configuration, an overlapping area between the first metal plate and the second metal plate can be increased, and the fatigue strength is further improved.

Advantageous Effects of Invention

According to the lap fillet weld joint and the production method of a lap fillet weld joint of the present invention, with a simple structure, the stress concentration in the welded portion is alleviated, and the welded portion in which the root gap is suppressed is formed, so that the joint fatigue strength can be effectively improved.

DESCRIPTION OF EMBODIMENTS

Hereinafter, embodiments of a lap fillet weld joint according to the present invention will be described with reference to the drawings.

First Embodiment

Figure 1:
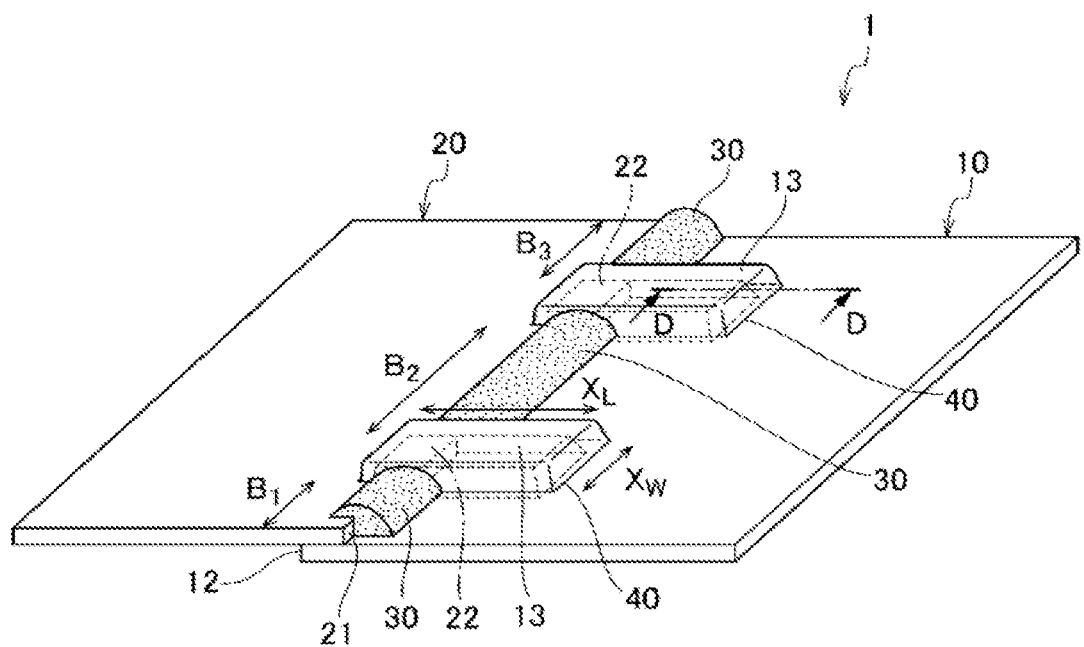
FIG. 1 is a perspective view showing a lap fillet weld joint according to a first embodiment of the present invention.
Figure 2:
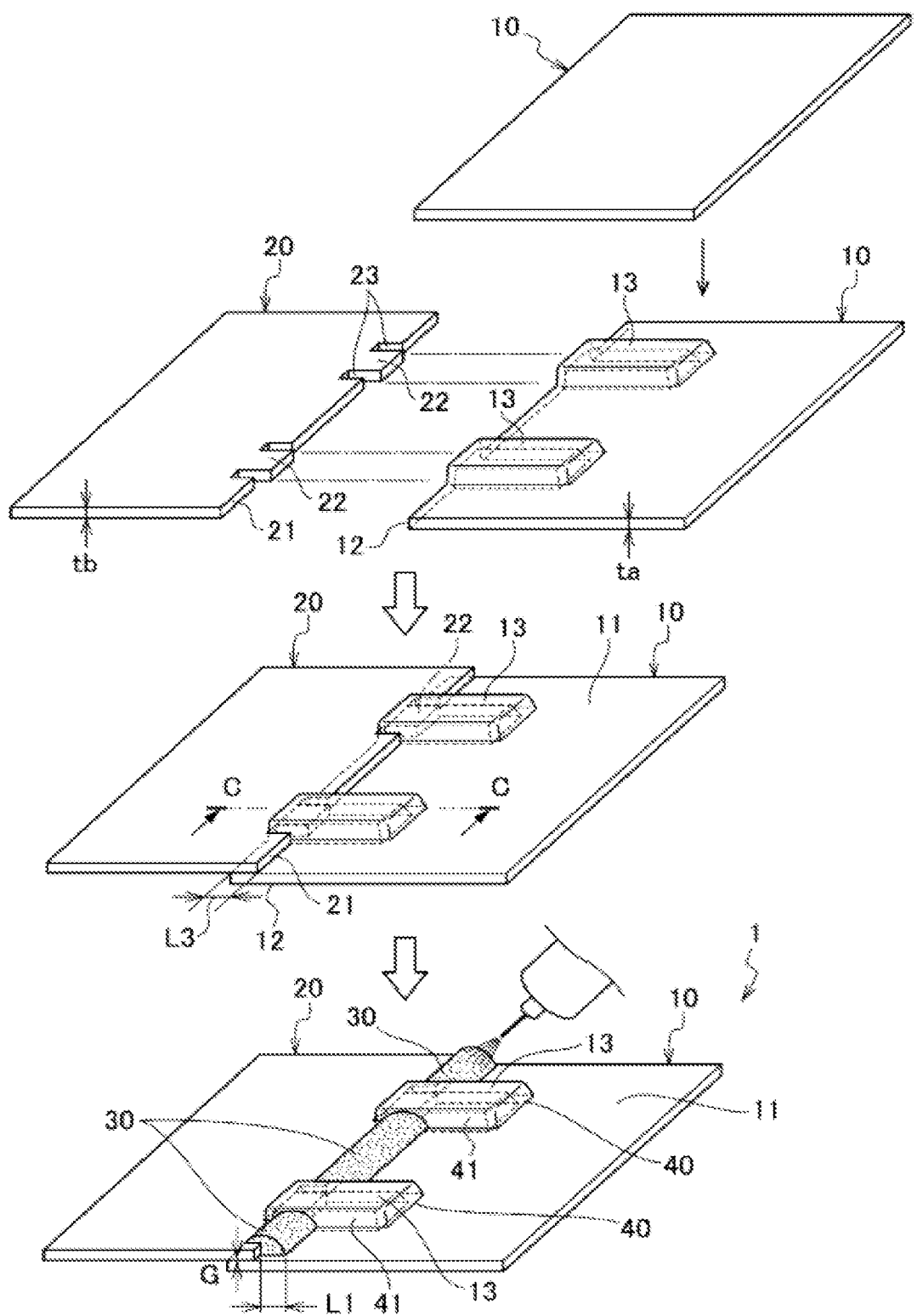
FIG. 2 is a perspective view showing production steps of the lap fillet weld joint shown in FIG. 1.
Figure 3:
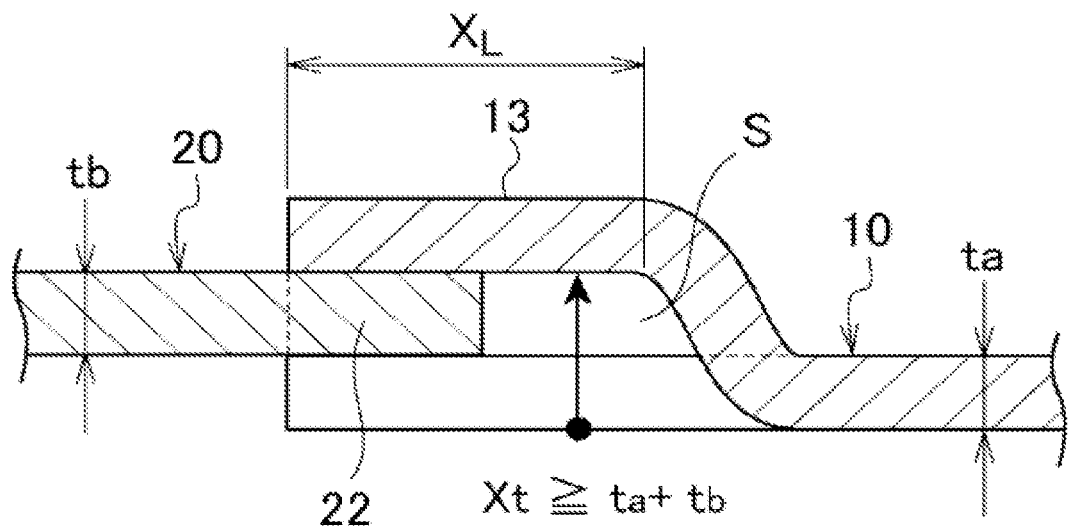
FIG. 3 is a cross-sectional view taken along a line C-C of the lap fillet weld joint shown in FIG. 2.

FIG. 1 is a perspective view showing a lap fillet weld joint according to a first embodiment of the present invention, FIG. 2 is a perspective view showing production steps of the lap fillet weld joint of FIG. 1, and FIG. 3 is a cross-sectional view taken along a line C-C of the lap fillet weld joint of FIG. 2. As shown in FIGS. 2 and 3, a lap fillet weld joint 1 according to the first embodiment of the present invention has a configuration in which a first metal plate 10 and a second metal plate 20 are overlapped with each other, and a second edge portion 21 of the second metal plate 20 is welded to the first metal plate 10.

In the following description, a side of the first metal plate 10 welded to the second metal plate 20 is referred to as one side, an opposite side is referred to as the other side, and an edge portion on the one side of the first metal plate 10 is referred to as a first edge portion 12. Further, a side of the second metal plate 20 welded to the first metal plate 10 is referred to as one side, an opposite side is referred to as the other side, and an edge portion on one side of the second metal plate 20 is referred to as the second edge portion 21. That is, the first edge portion 12 and the second edge portion 21 face each other, and the one side and the other side of the first metal plate 10 and the second metal plate 20 are opposite to each other.

Further, in the present embodiment, the first and second metal plates 10, 20 are planar thin plates each having a substantially rectangular shape, a direction in which the first and second metal plates 10, 20 are overlapped with each other is also referred to as a height direction, a direction along a welding line (each of the edge portions 12, 21) is also referred to as a width direction, and a direction separating from the welding line is also referred to as a length direction.

Figure 13:
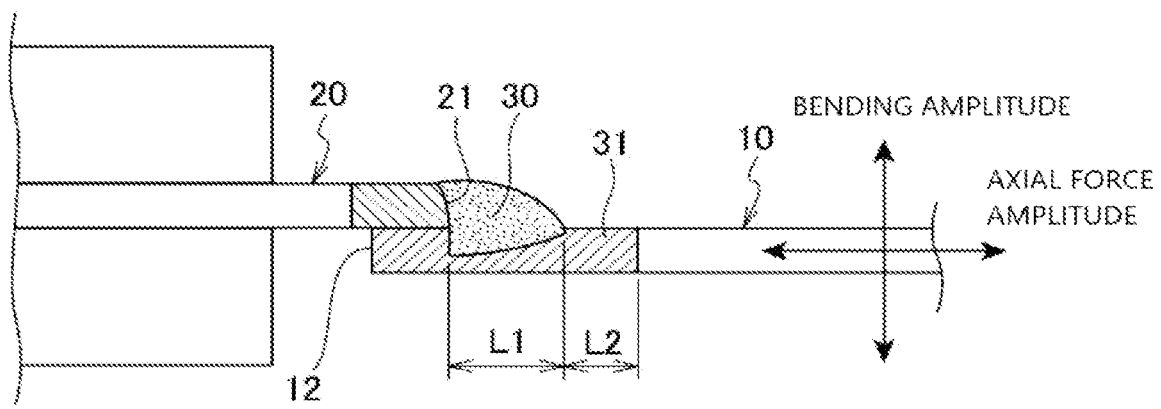
FIG. 13 is a cross-sectional view taken along a line A-A of the lap fillet weld joint shown in FIG. 12.
Figure 14:
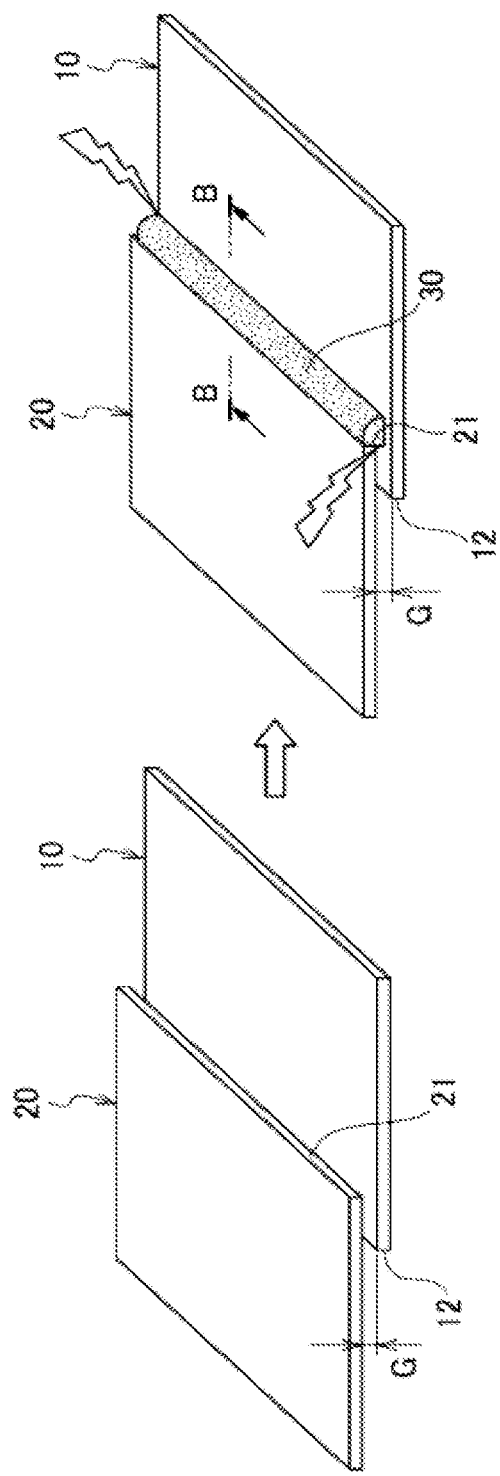
FIG. 14 is a perspective view of a lap fillet weld joint in related art having a gap.
Figure 15:
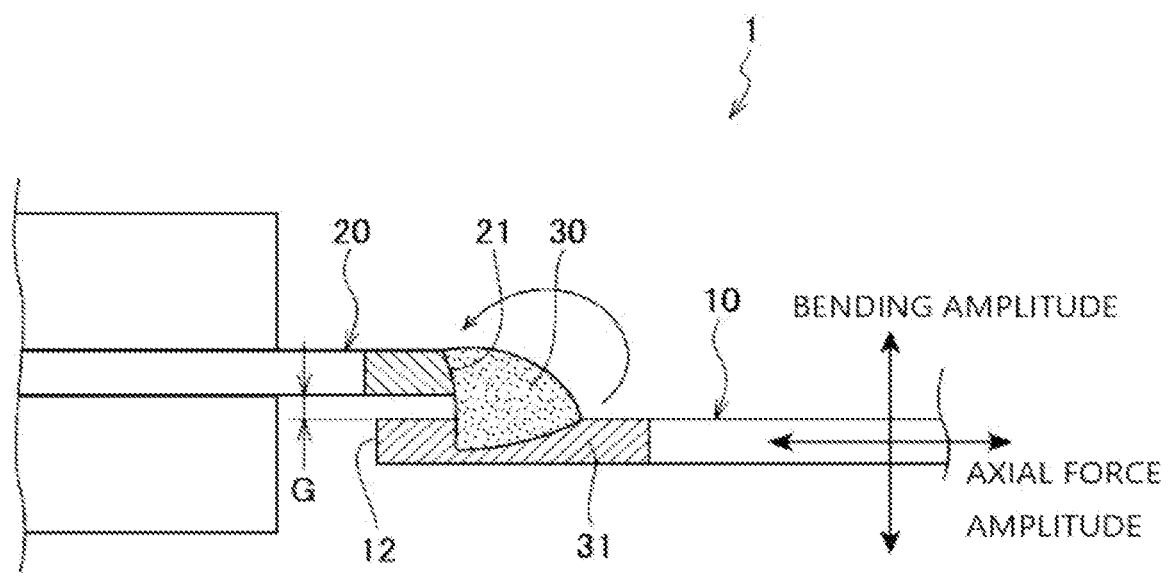
FIG. 15 is a cross-sectional view taken along a line B-B of the lap fillet weld joint shown in FIG. 14.

In the first metal plate 10, a plurality of bulging portions 13 bulging in a direction (surface side) facing the second metal plate 20 with respect to a planar plate portion and forming internal spaces S on a back surface side are formed at the first edge portion 12, which is a side welded to the second metal plate 20, in a way of being spaced from each other along the edge portion 12. For example, in the embodiment shown in FIG. 1, two bulging portions 13 are provided. A height Xt of the bulging portion 13 in a plate thickness direction of the first metal plate 10 is set to be equal to or greater than ta+tb, which is the sum of a plate thickness ta of the first metal plate 10 and a plate thickness tb of the second metal plate 20. A length $X_L$ in a length direction of the first metal plate 10 is set to a length exceeding L1+L2, which is the sum of a leg length L1 of a first weld bead 30 between the first metal plate 10 and the second metal plate 20 and a length L2 of a weld heat-affected zone 31 extending from the first weld bead 30 to the other side of the first metal plate 10 (see FIG. 13).

On the other hand, the second metal plate 20 includes a plurality of protruding portions 22 that are formed by cutouts 23 provided in the second edge portion 21 that is a side welded to the first metal plate 10 and protrude from the second edge portion 21 toward the first metal plate 10. For example, in the embodiment shown in FIG. 1, two protruding portions 22 are provided. The two protruding portions 22 are formed so as to correspond to intervals of the two bulging portions 13, and can be inserted into the internal spaces S of the bulging portions 13.

The bulging portion 13 of the first metal plate 10 can be easily and accurately formed by cold or hot pressing the first metal plate 10.

Then, the protruding portion 22 of the second metal plate 20 is inserted into the internal space S of the bulging portion 13 of the first metal plate 10, and the first metal plate 10 and the second metal plate 20 are overlapped with each other. Accordingly, a surface of the protruding portion 22 of the second metal plate 20 comes into contact with a back surface of the bulging portion 13, and a portion of a back surface of the second metal plate 20 on a side of the second edge portion 21 excluding the protruding portion 22 comes into contact with a surface 11 of the first metal plate 10, so that the second metal plate 20 is held by the first metal plate 10.

The height Xt in the thickness direction of the first metal plate 10 in the internal space S is preferably substantially equal to the sum of the plate thickness ta of the first metal plate 10 and the plate thickness tb of the second metal plate 20. However, since there is a possibility that the protruding portion 22 does not enter the internal space S of the bulging portion 13 if the height Xt is completely equal to the sum of the plate thickness ta and the plate thickness tb, a slight margin is actually provided. However, in this case, it is also desirable that at least a part of the surface of the protruding portion 22 of the second metal plate 20 is physically in contact with the back surface of the bulging portion 13, and thus the root gap G between the first metal plate 10 and the second metal plate 20 is suppressed to the minimum gap.

Further, in this embodiment, the surface of the protruding portion 22 of the second metal plate 20 and the back surface of the bulging portion 13 are substantially parallel to each other, but the bulging portion 13 may be gently inclined such that the height thereof gradually decreases from an inlet side of the protruding portion 22 toward a root portion 40 side (an edge portion on the other side of the first metal plate 10) to be described later. Specifically, in the bulging portion 13, the height Xt of an inlet side opening of the protruding portion 22 is set to be equal to or greater than ta+tb, which is the sum of the plate thickness ta of the first metal plate 10 and the plate thickness tb of the second metal plate 20, and the height Xt of the bulging portion 13 is set to be less than ta+tb, which is the sum of the plate thickness ta of the first metal plate 10 and the plate thickness tb of the second metal plate 20, in a region where the bulging portion 13 and the protruding portion 22 are overlapped with each other in the length direction of the first metal plate 10. Such a bulging portion 13 facilitates insertion of the protruding portion 22 into the bulging portion 13, and at the same time, the protruding portion 22 is pushed into the bulging portion 13 to abut on the bulging portion 13, so that the first metal plate 10 and the second metal plate 20 can be restrained without loosening.

Next, in a state where the protruding portion 22 is inserted into the bulging portion 13, a part of the second edge portion 21 of the second metal plate 20 and a part of the surface 11 of the first metal plate 10 are welded by arc welding or laser arc hybrid welding to form the first weld bead 30. Here, the welded part is the second edge portion 21 of the second metal plate 20 exposed on the surface 11 of the first metal plate 10, and the second edge portion 21 of the protruding portion 22 inserted into the bulging portion 13 is not welded. The first weld bead 30 may be formed in contact with an outer side surface 41 of the bulging portion 13 extending from the first edge portion 12 of the bulging portion 13 toward the other side.

In the weld joint 1 of the present embodiment, when a load in the plate thickness direction acts on the weld joint 1, a root portion 40 on the side spaced from the first edge portion 12 of the bulging portion 13 becomes a part of a stress concentration portion, so that stress concentration can be alleviated from the first weld bead 30 which is a weld portion. Therefore, the stress concentration does not act on the weld heat-affected zone 31 (see FIG. 13) where strength is decreased due to an influence of welding heat, and base metal strength of the first metal plate 10 and the second metal plate 20 is maintained.

Accordingly, since the root portion 40 serving as the stress concentration portion is separated from the first weld bead 30, the influence of the weld heat-affected zone 31, where the strength is decreased due to the welding heat, on a fatigue strength of the lap fillet weld joint 1 is small, and the strength of the first metal plate 10 and the second metal plate 20, which are the base metal, is maintained.

As in the present embodiment, when the bulging portion 13 of the first metal plate 10 and the edge portion 21 of the second metal plate 20 are overlapped with each other by the cutouts 23 formed in the rectangular second metal plate 20 to make the first metal plate 10 and the second metal plate 20 overlap with each other, it is preferable that the length $X_L$ of the bulging portion 13 in the length direction of the first metal plate 10 also takes into consideration a length L3 of the overlapping portion of the first metal plate 10 and the second metal plate 20. That is, in the present embodiment, in the bulging portion 13, the length $X_L$ in the length direction of the first metal plate 10 is set to a length exceeding the sum L1+L2+L3 of the leg length L1 of the first weld bead 30 between the first metal plate 10 and the second metal plate 20, the length L2 of the weld heat-affected zone 31 extending from the first weld bead 30 to the other side of the first metal plate 10, and the length L3 of the overlapping portion of the first metal plate 10 and the second metal plate 20.

Further, the gap G between the first metal plate 10 and the second metal plate 20 is suppressed to the minimum gap without using a clamp jig or the like commonly used for suppressing the gap G between the plates, and the fatigue strength of the weld joint 1 is improved. It should be noted that the larger the number of clamp jigs, the higher the effect of suppressing the gap G, but when the number of clamp jigs increases, the number of setting steps and the jig cost increase, which is not preferable.

Figure 4:
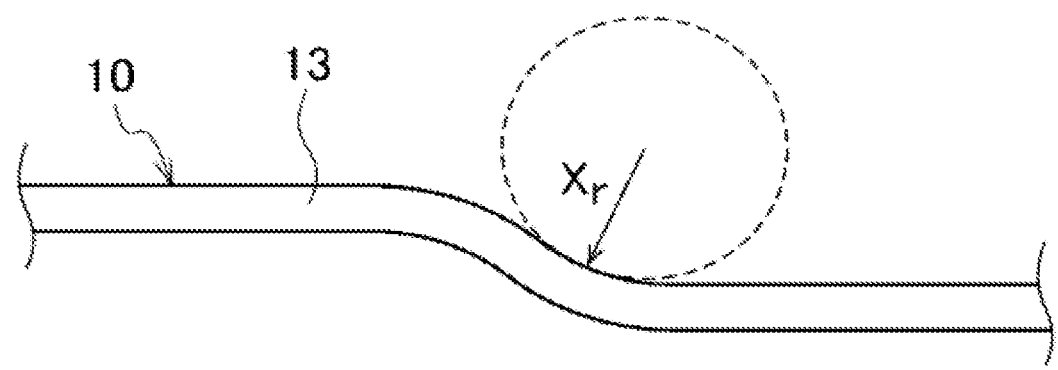
FIG. 4 is a cross-sectional view taken along a line D-D of a first metal plate shown in FIG. 1.

Further, by appropriately setting the length $X_L$ of the single bulging portion 13, a width $X_W$ of the single bulging portion 13, a ratio ($\Sigma X_{b2}/\Sigma B$) of a total length ($\Sigma X_W$) of the widths $X_W$ of the bulging portions 13 to a total length ($\Sigma B$; $\Sigma B=B_1+B_2+B_3$ in the example shown in FIG. 1) of the first weld bead 30, and the radius Xr of the root portion 40 of the bulging portion 13 as shown in FIG. 4, the strength can be optimized. Since the bulging portion 13 is formed by press working (press molding), the radius Xr of the root portion 40 of the bulging portion 13 can be formed in a smooth shape stably.

As described above, according to the lap fillet weld joint 1 of the present embodiment, since the gap G between the first metal plate 10 and the second metal plate 20 can be suppressed, welding performance is stabilized. Further, a shape of the bulging portion 13 formed by the press working is not damaged by welding, and fatigue resistance is improved.

In the present embodiment, a tip end portion of the protruding portion 22 of the second metal plate 20 protrudes from the second edge portion 21 from the viewpoint of joint rigidity, but the present invention is not limited thereto, and the tip end portion of the protruding portion 22 may be located at the same position as the second edge portion 21 in the length direction.

Figure 5:
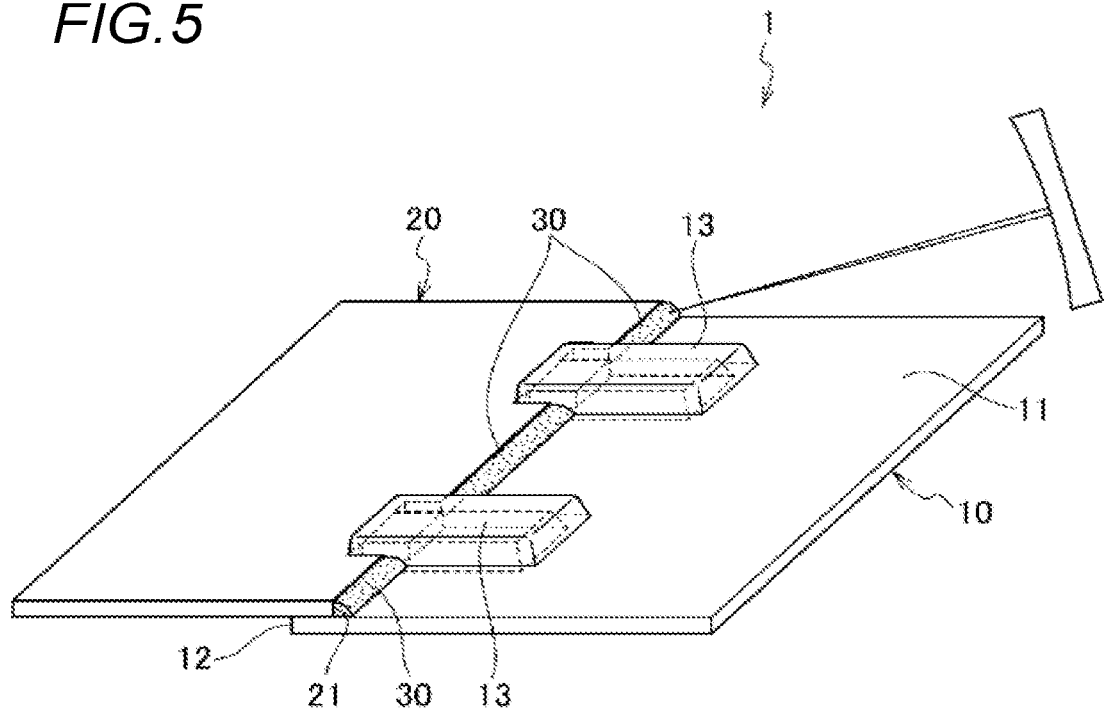
FIG. 5 is a perspective view of a lap fillet weld joint according to a first modification of the first embodiment.

FIG. 5 is a perspective view of a lap fillet weld joint of a first modification of the first embodiment, in which the second edge portion 21 of the second metal plate 20 and the surface 11 of the first metal plate 10 are welded by laser welding to form the first weld bead 30. At the time of laser welding, a filler wire may be separately used.

Next, lap fillet weld joints of a second modification and a third modification of the first embodiment will be described with reference to FIGS. 6 and 7.

Figure 6:
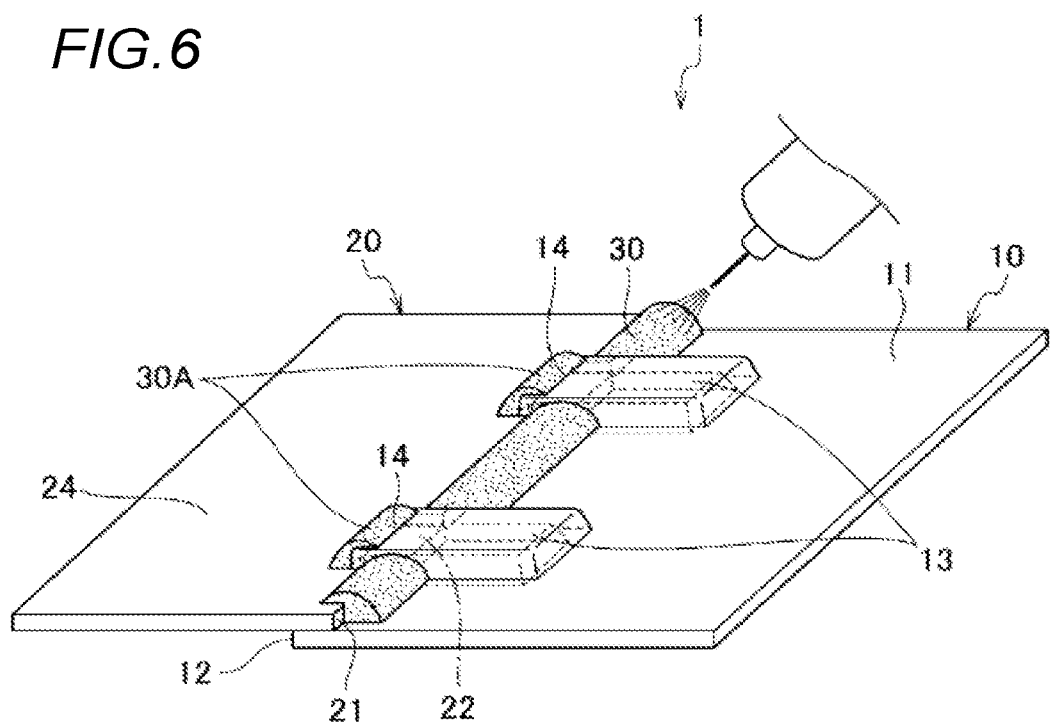
FIG. 6 is a perspective view of a lap fillet weld joint according to a second modification of the first embodiment.

In the weld joint 1 of the second modification, as shown in FIG. 6, the protruding portions 22 of the second metal plate 20 are inserted into and fitted to the bulging portions 13 of the first metal plate 10, and the second edge portion 21 of the second metal plate 20 and the surface 11 of the first metal plate 10 are welded by arc welding or laser arc hybrid welding to form the first weld bead 30. Further, first edge portions 14 of the bulging portions 13 and a surface 24 of the second metal plate 20 are welded by the arc welding or the laser arc hybrid welding to form second weld beads 30A. The first weld bead 30 and the second weld bead 30A may be welded continuously. Accordingly, the number of welding steps is reduced as compared with a case where the first weld bead 30 and the second weld bead 30A are welded in separate steps.

Figure 7:
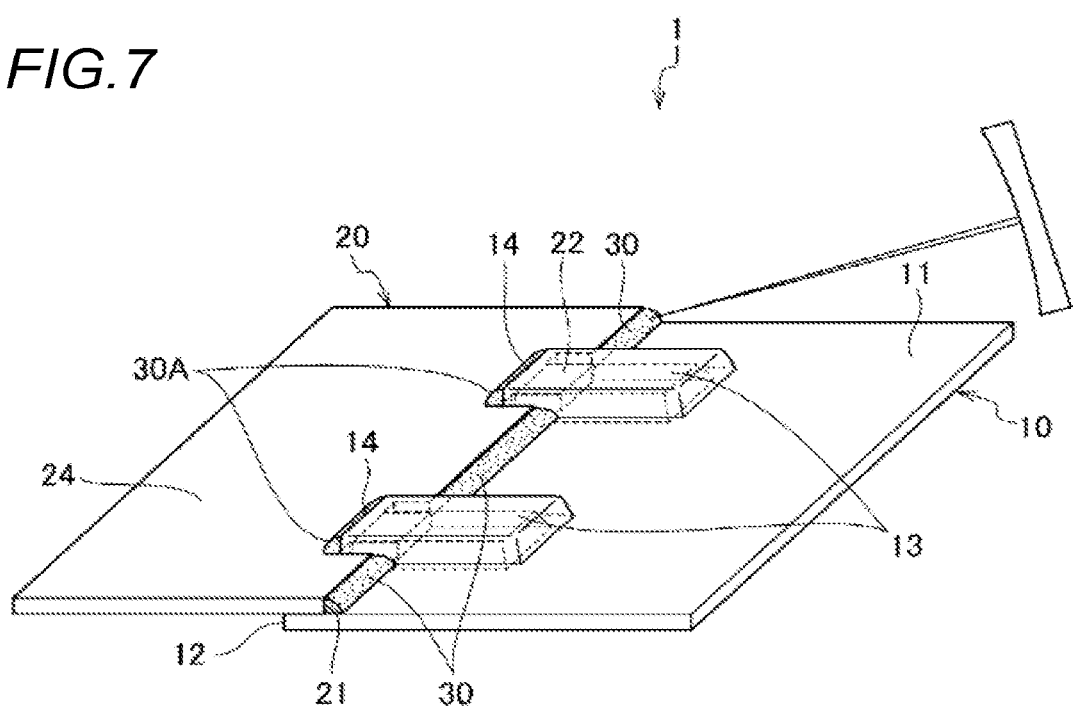
FIG. 7 is a perspective view of a lap fillet weld joint according to a third modification of the first embodiment.

In the lap fillet weld joint 1 of the third modification, as shown in FIG. 7, the protruding portions 22 of the second metal plate 20 are inserted into and fitted to the bulging portions 13 of the first metal plate 10, the second edge portion 21 of the second metal plate 20 and the surface 11 of the first metal plate 10 are laser-welded to form the first weld bead 30, and the first edge portions 14 of the bulging portions 13 and the surface 24 of the second metal plate 20 are laser-welded to form the second weld beads 30A. The first weld bead 30 and the second weld bead 30A may be welded continuously by the laser welding.

Second Embodiment

Figure 8:
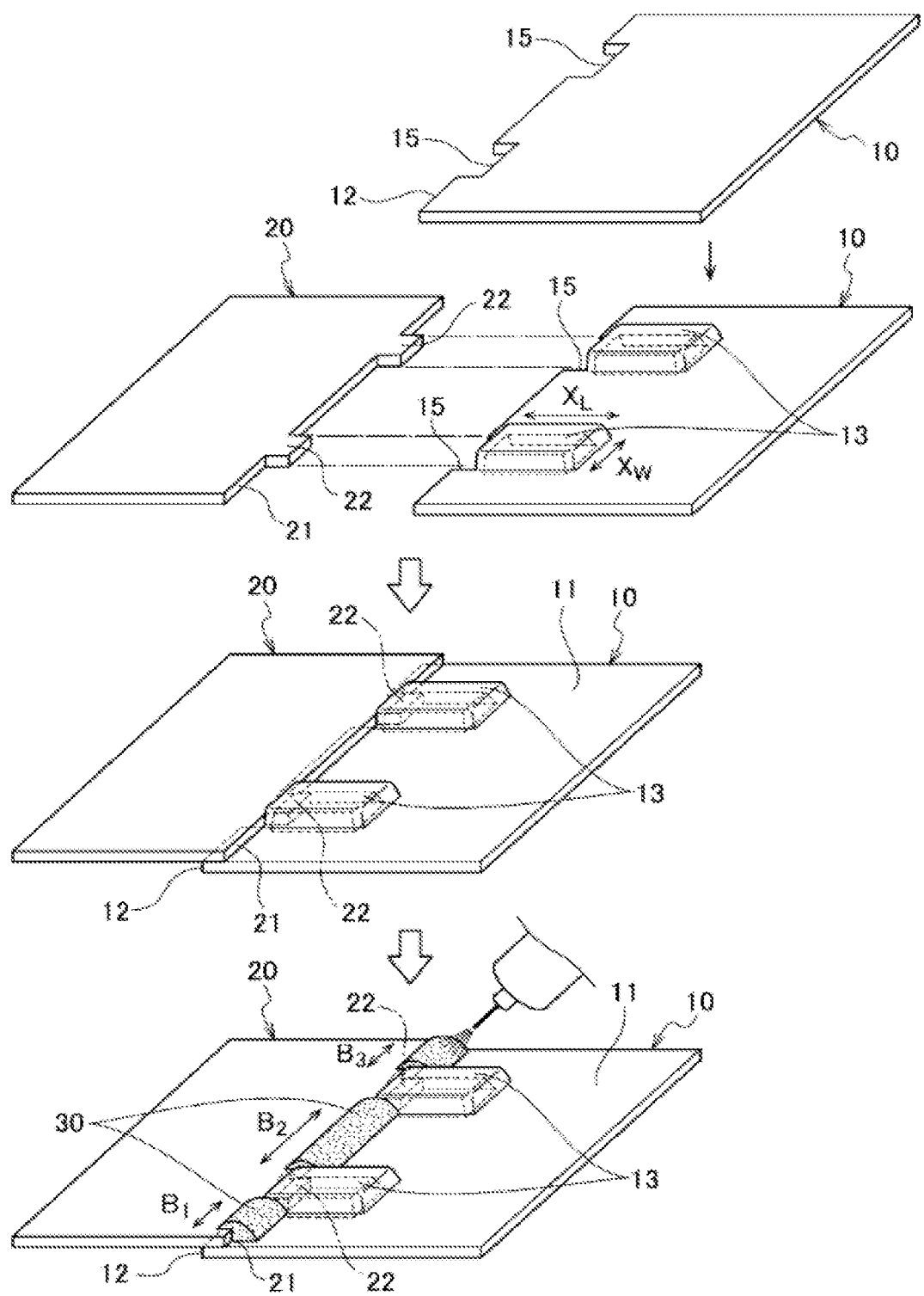
FIG. 8 is a perspective view showing production steps of a lap fillet weld joint according to a second embodiment of the present invention.

FIG. 8 is a perspective view showing production steps of a lap fillet weld joint according to a second embodiment of the present invention. As shown in FIG. 8, in the first edge portion 12 of the first metal plate 10 of the second embodiment, a plurality of cutout portions 15 are formed along the first edge portion 12. For example, in the embodiment shown in FIG. 8, two cutout portions 15 are provided. The bulging portions 13 are formed at the cutout portions 15, respectively.

Similarly to the first metal plate 10 of the first embodiment, the bulging portion 13 has the internal space S in which the height Xt in the plate thickness direction of the first metal plate 10 is equal to or greater than ta+tb, which is the sum of the plate thickness ta of the first metal plate 10 and the plate thickness tb of the second metal plate 20, and a length in the direction from the first edge portion 12 toward the other side is the length $X_L$ (see FIG. 2). The length $X_L$ exceeds L1+L2, which is the sum of the leg length L1 of the first weld bead 30 between the first metal plate 10 and the second metal plate 20 and the length L2 of the weld heat-affected zone 31 extending from the first weld bead 30 to the other side of the first metal plate 10 (see FIG. 13).

On the other hand, the second metal plate 20 has the plurality of protruding portions 22 protruding in the direction of the first metal plate 10 from the second edge portion 21 which is a side welded to the first metal plate 10. The protruding portion 22 is formed so as to correspond to the intervals of the bulging portions 13, and can be inserted into the internal space S of the bulging portion 13.

Then, the protruding portion 22 of the second metal plate 20 is inserted into and fitted to the bulging portion 13 of the first metal plate 10, and the first metal plate 10 and the second metal plate 20 are overlapped with each other. Accordingly, a surface of the protruding portion 22 of the second metal plate 20 comes into contact with a back surface of the bulging portion 13, and a portion of a back surface of the second metal plate 20 on the second edge portion 21 side excluding the protruding portion 22 comes into contact with the surface 11 of the first metal plate 10, so that the second metal plate 20 is held by the first metal plate 10. Accordingly, the gap G between the first metal plate 10 and the second metal plate 20 is suppressed to the minimum gap.

Next, a part of the edge portion 21 of the second metal plate 20 and a part of the surface 11 of the first metal plate 10 are welded by any one of arc welding, laser welding, and laser arc hybrid welding to form the first weld bead 30. Further, the second weld bead 30A may be formed by welding the first edge portion 14 of the bulging portion 13 and the surface 24 of the second metal plate 20 by any one of the arc welding, the laser welding, and the laser arc hybrid welding.

Figure 9:
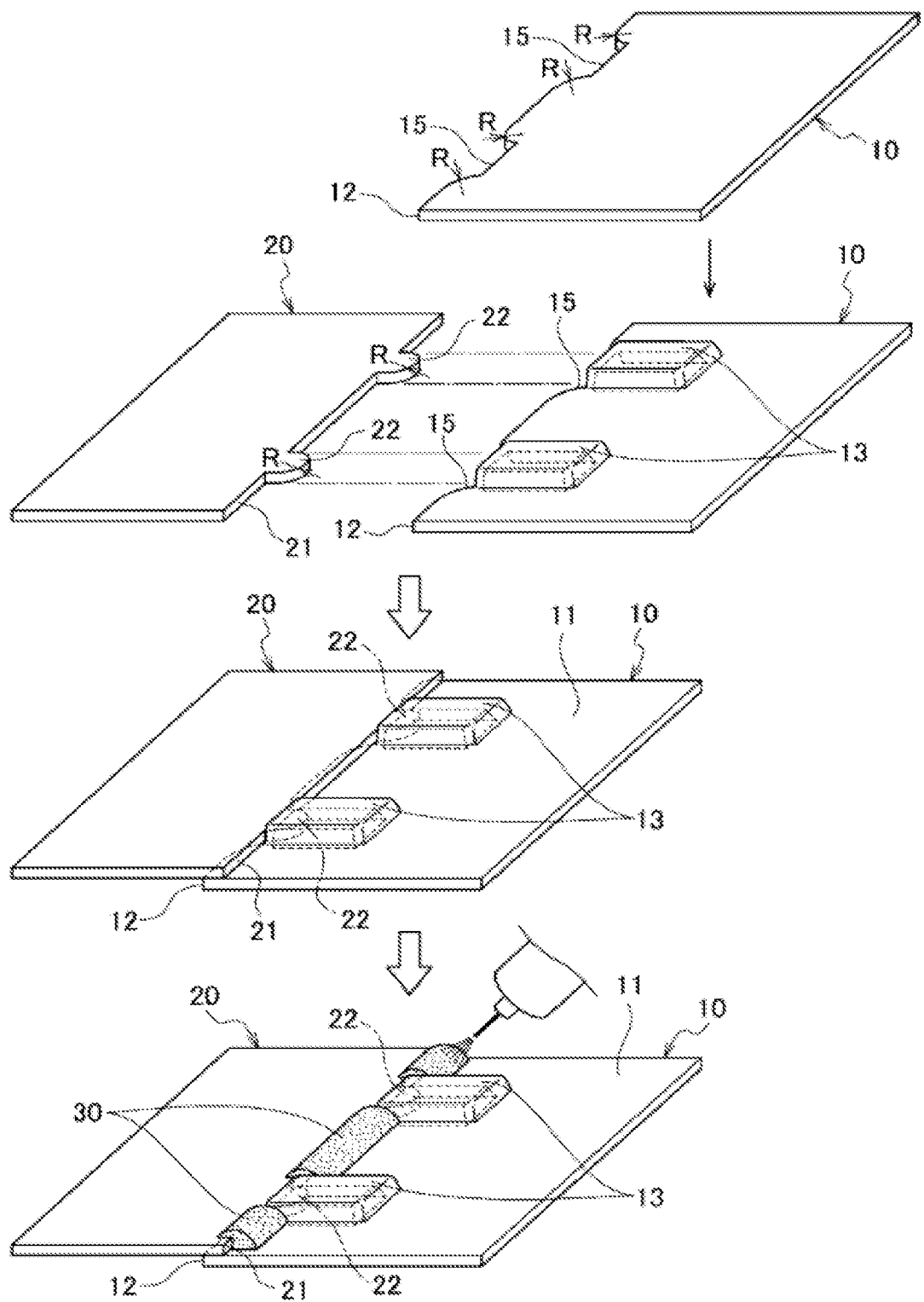
FIG. 9 is a perspective view showing production steps of a lap fillet weld joint according to a first modification of the second embodiment.

FIG. 9 is a perspective view showing production steps of a lap fillet weld joint according to a first modification of the second embodiment. In the present modification, the cutout portion 15 formed along the first edge portion 12 of the first metal plate 10 has corner portions each formed in an R shape, and each of the bulging portions 13 is formed at the cutout portion 15.

The bulging portion 13 has the internal space S having the same size as that of the first metal plate 10 of the second embodiment. That is, the bulging portion 13 has the internal space S in which the height Xt in the plate thickness direction of the first metal plate 10 is equal to or greater than ta+tb, which is the sum of the plate thickness ta of the first metal plate 10 and the plate thickness tb of the second metal plate 20, and a length in the direction from the first edge portion 12 toward the other side is the length $X_L$.

On the other hand, in the second metal plate 20, the plurality of protruding portions 22 protruding in the direction of the first metal plate 10 are formed at the second edge portion 21 with which the first metal plate 10 is overlapped, corresponding to the intervals of the bulging portions 13. The shape of the protruding portion 22 is an R shape.

Then, the protruding portion 22 of the second metal plate 20 is inserted into and fitted to the bulging portion 13 of the first metal plate 10, the first metal plate 10 and the second metal plate 20 are overlapped with each other, and the second edge portion 21 of the second metal plate 20 and the surface 11 of the first metal plate 10 are welded by any one of the arc welding, the laser welding, and the laser arc hybrid welding to form the first weld bead 30.

By forming the cutout portion 15 of the first metal plate 10 and the protruding portion 22 of the second metal plate 20 in the R shape, an overlapping area between the first metal plate 10 and the second metal plate 20 can be increased, and joining strength is improved.

Figure 10:
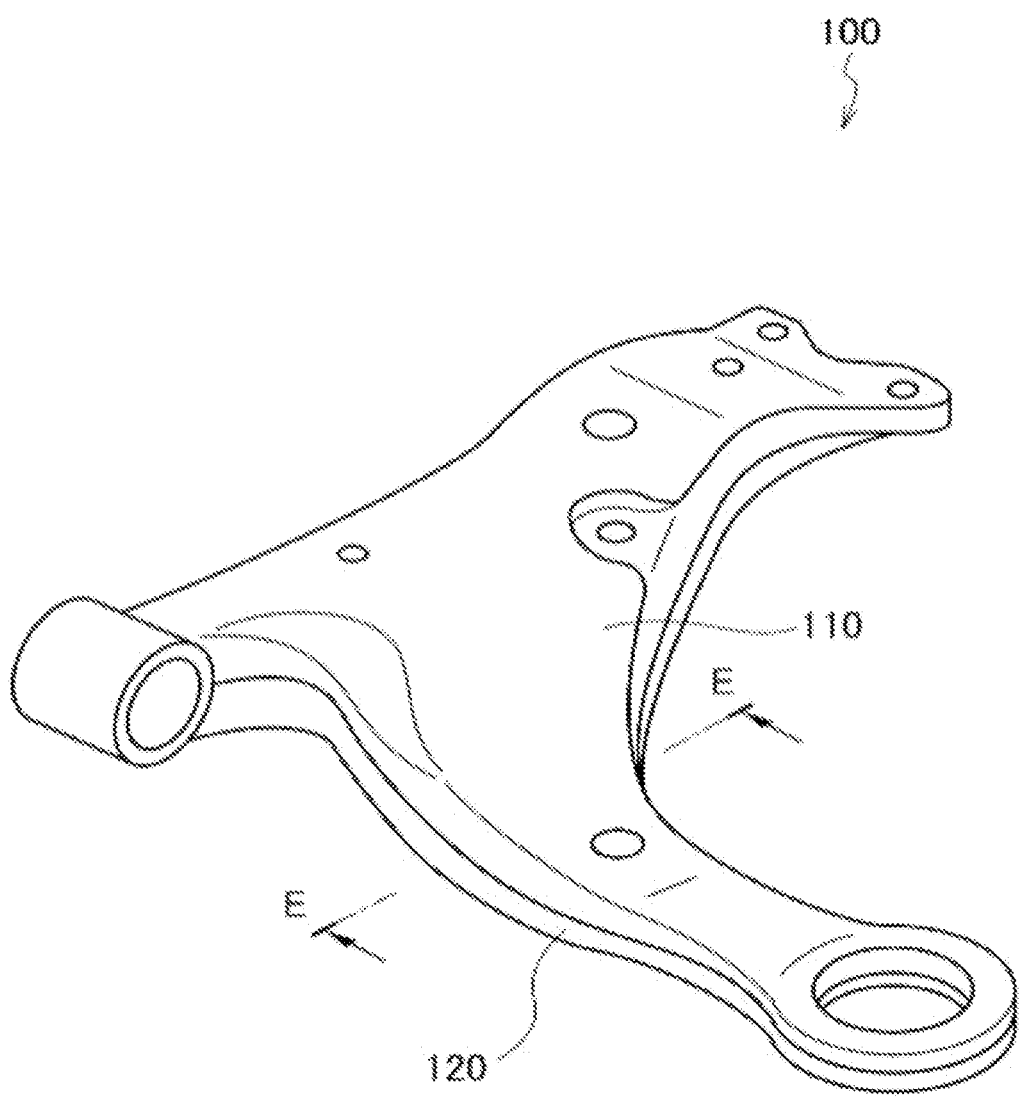
FIG. 10 is a perspective view of a suspension arm that is an example of the lap fillet weld joint of the present invention.

FIG. 10 is a perspective view of a suspension arm 100 which is an example of the lap fillet weld joint 1 described above, and FIG. 11 is a perspective view schematically showing a cross section taken along a line E-E of FIG. 10. In the suspension arm 100, a first member 110 and a second member 120 each formed in a substantially bowl shape are abutted on each other, and a joint surface thereof is welded by any one of the arc welding, the laser welding, and the laser arc hybrid welding.

Figure 11:
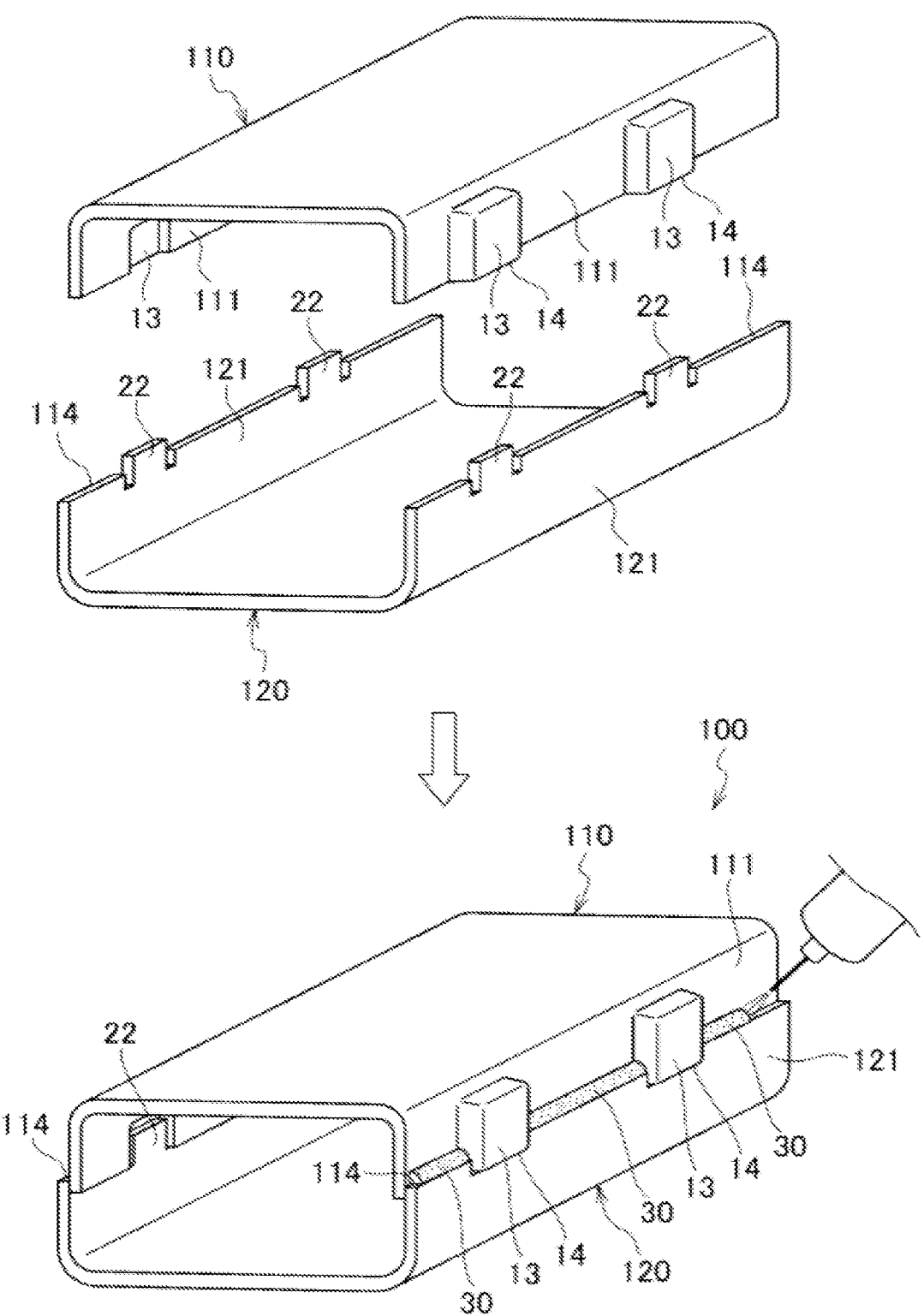
FIG. 11 is a perspective view schematically showing a cross section taken along a line E-E of FIG. 10.
Figure 12:
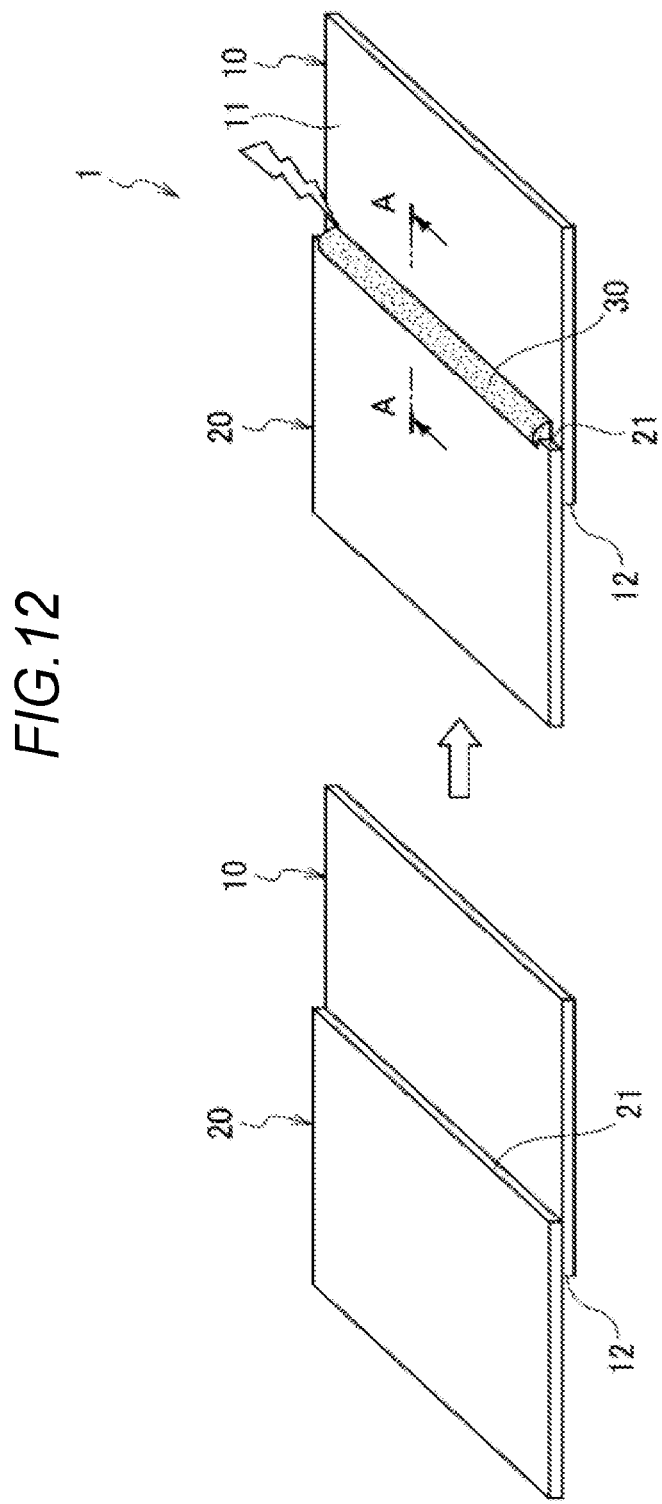
FIG. 12 is a perspective view of a lap fillet weld joint in related art produced by overlapping and welding two metal plates.

As shown in FIG. 11, each of the first member 110 and the second member 120 is formed in a substantially gutter shape whose cross section is curved inward, and erected portions 111 are provided at both end portions in the width direction of the first member 110, and erected portions 121 are provided at both end portions in the width direction of the second member 120 so as to correspond to the erected portions 111. In each of the erected portions 111 of the first member 110, the plurality of bulging portions 13 described in the first embodiment (see FIG. 1) is formed so as to be spaced from each other in the length direction. Further, the plurality of protruding portions 22 described in the first embodiment (see FIG. 1) is formed at each erected portion 121 of the second member 120 so as to correspond to the intervals of the bulging portions 13.

Then, after the protruding portion 22 of the second member 120 is inserted into the bulging portion 13 of the first member 110 and the end portions of the erected portion 111 and the erected portion 121 are overlapped with each other, the edge portion 114 of the second member 120 and the erected portion 111 of the first member 110 are welded to each other by any one of the arc welding, the laser welding, and the laser arc hybrid welding to form the first weld bead 30. Further, although not shown, the second weld bead 30A may be formed by welding the first edge portion 14 of the bulging portion 13 and the second member 120 by any one of the arc welding, the laser welding, and the laser arc hybrid welding.

Accordingly, the lap fillet weld joint 1 is also applied to a hollow member with a closed cross section having any shape, light weight, and high fatigue resistance strength.

Note that the present invention is not limited to the above-described embodiments and modifications, and modifications, improvements, and the like can be made as appropriate.

For example, in the above-described embodiment, any one of the arc welding, the laser welding, and the laser arc hybrid welding is described as a joining method, but the joining method is not limited thereto, and brazing or the like can also be used. In this case, different materials can also be joined to each other.

Further, in the above-described embodiment, the second metal plate is provided with the protruding portion by providing the cutout in the edge portion on one side thereof, but for example, the edge portion on the one side may be formed in a corrugated shape in which a concave portion and a convex portion are continuous, and the convex portion may be formed as the protruding portion.

Further, according to the present invention, the root gap can be suppressed as long as the second metal plate is held by the first metal plate by bringing the back surface of the second metal plate on a second edge portion side into contact with the surface of the first metal plate and bringing at least one back surface of the plurality of bulging portions into contact with at least one surface of the plurality of protruding portions of the second metal plate.

Although various embodiments have been described above with reference to the drawings, it is needless to say that the present invention is not limited to such examples. It will be apparent to those skilled in the art that various changes and modifications can be conceived within the scope of the claims, and it is also understood that the various changes and modifications belong to the technical scope of the present invention. In addition, components in the embodiments described above may be combined freely within a range not departing from the spirit of the invention.

The present application is based on Japanese Patent Application filed on Jul. 15, 2020 (Japanese Patent Application No. 2020-121667), and the contents thereof are incorporated herein by reference.

REFERENCE SIGNS LIST 1 lap fillet weld joint
10 first metal plate
12 first edge portion (edge portion on one side of first metal plate)
13 bulging portion
15 cutout portion
20 second metal plate
21 second edge portion (edge portion on one side of second metal plate, end surface)
22 protruding portion
23 cutout
30 first weld bead
30A second weld bead
31 weld heat-affected zone
100 suspension arm (member with closed cross section)
L1 leg length of weld bead
L2 length of weld heat-affected zone
S internal space
ta plate thickness of first metal plate
tb plate thickness of second metal plate $X_L$ length of bulging portion (length in direction from edge portion on one side toward edge portion on the other side of first metal plate)

Xt height of bulging portion in plate thickness direction (height in plate thickness direction of first metal plate)

$X_W$ width of bulging portion

The invention claimed is:

1. A lap fillet weld joint produced by overlapping and welding a first metal plate and a second metal plate,
wherein the first metal plate has a bulging portion on an edge portion on one side which is a side welded to the second metal plate, the bulging portion extending along a length direction from the edge portion on the one side toward an edge portion on the other side of the first metal plate, and bulging in a front surface side direction facing the second metal plate with respect to a flat plate portion so as to form an internal space on a back surface side of the first metal plate at the edge portion on the one side of the first metal plate,
wherein the second metal plate has a protruding portion on an edge portion on one side which is a side welded to the first metal plate, the protruding portion protruding in a direction from an edge portion on the other side of the second metal plate toward the edge portion on the one side of the second metal plate, and configured to be inserted into the internal space of the bulging portion,
wherein the lap fillet weld joint comprises a first weld bead formed by welding the first metal plate and the edge portion of the second metal plate on the one side of the first metal plate in a state where the protruding portion is inserted into the internal space of the bulging portion such that the first metal plate and the second metal plate are overlapped with each other in which a surface of the protruding portion comes into contact with a back surface of the bulging portion, and a portion of a back surface of the second metal plate on the edge portion on the one side of the second metal plate adjacent to and excluding the protruding portion comes into contact with a front surface of the first metal plate so that the second metal plate is held by the first metal plate, and
wherein the bulging portion is formed such that a height of the first metal plate in a plate thickness direction is equal to or greater than a sum of a plate thickness of the first metal plate and a plate thickness of the second metal plate, and a length of the first metal plate in the length direction exceeds a sum of a leg length of the first weld bead between the first metal plate and the second metal plate and a length of a weld heat-affected zone extending from the first weld bead to the other side of the first metal plate.

2. The lap fillet weld joint according to claim 1, wherein in the second metal plate, the protruding portion is formed between a pair of cutouts that is formed along the length direction from the edge portion on the one side of the second metal plate.

3. The lap fillet weld joint according to claim 2, wherein the bulging portion is formed by press molding.

4. The lap fillet weld joint according to claim 1, wherein the bulging portion is formed by press molding.

5. The lap fillet weld joint according to claim 1, further comprising:
a second weld bead formed by welding the second metal plate and the edge portion of the first metal plate on the one side of the first metal plate at a position corresponding to the bulging portion.

6. The lap fillet weld joint according to claim 5,
wherein the first metal plate has at least one cutout portion in the edge portion on the one side of the first metal plate, and
wherein the bulging portion is formed at a position corresponding to the cutout portion.

7. The lap fillet weld joint according to claim 5,
wherein the first weld bead and the second weld bead are continuously formed.

8. The lap fillet weld joint according to claim 7,
wherein the first metal plate has at least one cutout portion in the edge portion on the one side of the first metal plate, and
wherein the bulging portion is formed at a position corresponding to the cutout portion.

9. The lap fillet weld joint according to claim 1,
wherein the first metal plate has at least one cutout portion in the edge portion on the one side of the first metal plate, and
wherein the bulging portion is formed at a position corresponding to the cutout portion.

10. The lap fillet weld joint according to claim 1,
wherein the height of the first metal plate in the plate thickness direction in an internal space formed by the bulging portion is substantially equal to the sum of the plate thickness of the first metal plate and the plate thickness of the second metal plate.

11. The lap fillet weld joint according to claim 1,
wherein the bulging portion is formed such that the height of the first metal plate in the plate thickness direction gradually decreases from an inlet side of the protruding portion toward the edge portion of the first metal plate on the other side of the first metal plate.

12. A member with a closed cross section to which the lap fillet weld joint according to claim 1 is applied.

13. A production method of a lap fillet weld joint produced by overlapping and welding a first metal plate and a second metal plate, comprising:
forming a bulging portion on an edge portion of the first metal plate on one side of the first metal plate, which is a side to be welded to the second metal plate, the bulging portion extending along a length direction from the edge portion on the one side toward an edge portion on the other side of the first metal plate, and bulging in a front surface side direction facing the second metal plate with respect to a flat plate portion so as to form an internal space on a back surface side of the first metal plate at the edge portion on the one side of the first metal plate;
forming a protruding portion on an edge portion of the second metal plate on one side of the second metal plate, which is a side to be welded to the first metal plate, the protruding portion protruding in a direction from an edge portion on the other side of the second metal plate toward the edge portion on the one side of the second metal plate, and configured to be inserted into the internal space of the bulging portion;
overlapping the first metal plate with the second metal plate while inserting the protruding portion into the internal space of the bulging portion such that the first metal plate and the second metal plate are overlapped with each other in which a surface of the protruding portion comes into contact with a back surface of the bulging portion, and a portion of a back surface of the second metal plate on the edge portion on the one side of the second metal plate adjacent to and excluding the protruding portion comes into contact with a front surface of the first metal plate so that the second metal plate is held by the first metal plate; and forming a first weld bead by welding the first metal plate and the edge portion of the second metal plate on the one side of the first metal plate, wherein the bulging portion is formed such that a height of the first metal plate in a plate thickness direction is equal to or greater than a sum of a plate thickness of the first metal plate and a plate thickness of the second metal plate, and a length of the first metal plate in the length direction exceeds a sum of a leg length of the first weld bead between the first metal plate and the second metal plate and a length of a weld heat-affected zone extending from the first weld bead to the other side of the first metal plate.

14. The production method of a lap fillet weld joint according to claim 13, wherein in the second metal plate, the protruding portion is formed between a pair of cutouts that is formed along the length direction from the edge portion on the one side of the second metal plate.

15. The production method of a lap fillet weld joint according to claim 13, wherein the bulging portion is formed by press molding.

16. The production method of a lap fillet weld joint according to claim 13, wherein forming the first weld bead is performed by any one of an arc welding method, a laser welding method, and a laser arc hybrid welding method.

17. The production method of a lap fillet weld joint according to claim 13, further comprising:

forming a second weld bead by welding the second metal plate and the edge portion of the first metal plate on the one side of the first metal plate at a position corresponding to the bulging portion.

18. The production method of a lap fillet weld joint according to claim 17, further comprising:

forming at least one cutout portion in the edge portion of the first metal plate on the one side of the first metal plate before forming the bulging portion on the first metal plate, wherein the bulging portion is formed at a position corresponding to the cutout portion.

19. The production method of a lap fillet weld joint according to claim 17, wherein the first weld bead and the second weld bead are formed by continuous welding.

20. The production method of a lap fillet weld joint according to claim 19, further comprising:

forming at least one cutout portion in the edge portion of the first metal plate on the one side of the first metal plate before forming the bulging portion on the first metal plate, wherein the bulging portion is formed at a position corresponding to the cutout portion.

21. The production method of a lap fillet weld joint according to claim 13, further comprising:

forming at least one cutout portion in the edge portion of the first metal plate on the one side of the first metal plate before forming the bulging portion on the first metal plate, wherein the bulging portion is formed at a position corresponding to the cutout portion.

* * * * *